UNITED STATES PATENT OFFICE.

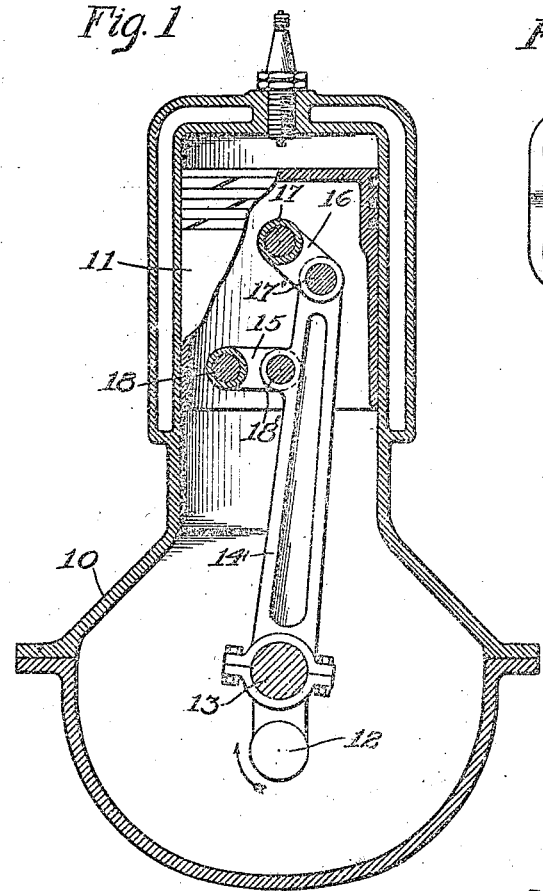
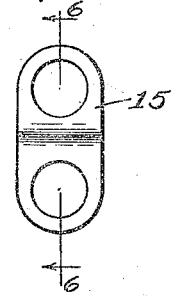
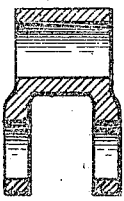
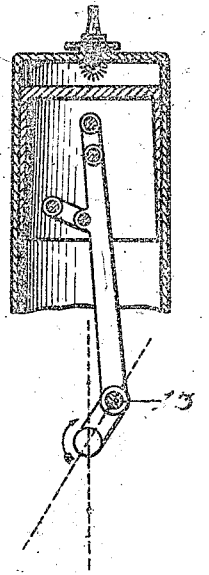
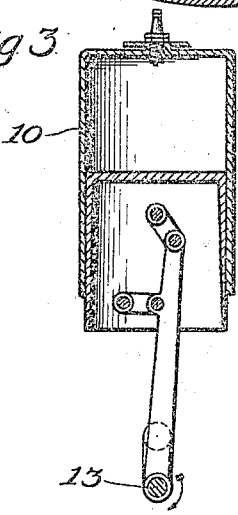
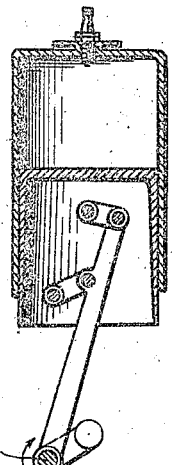

AXEL J. BOHMAN, OF MINNEAPOLIS, MINNESOTA.

INTERNAL-COMBUSTION ENGINE.

1,420,236.                Specification of Letters Patent.    Patented June 20, 1922.

Application filed February 27, 1922. Serial No. 539,711.

*To all whom it may concern:*

Be it known that I, AXEL J. BOHMAN, a subject of the King of Sweden, residing at Minneapolis, in the county of Hennepin and State of Minnesota, have invented new and useful Improvements in Internal-Combustion Engines, of which the following is a specification.

This invention relates to internal combustion engines and more particularly to the connection between the piston and crank shaft. The invention has for its object to provide a connection between the piston and crank shaft of such character that the movement of the piston toward the crank shaft shall be delayed until the crank of said shaft shall have passed a substantial distance to one side of its upper dead center. The arrangement is such that the crank receives the initial impulse from the explosion in a most advantageous position, viz., in a position considerably removed from dead center.

In the drawings forming part of this specification, Fig. 1 is a view through an internal combustion engine showing the preferred form of the invention; Fig 2 is a diagrammatic view showing the piston ready to begin its downward stroke, the crank being already past its dead center; Fig. 3 shows the position of the parts when the crank has reached its lowermost point; Fig. 4 shows the parts in a still different position; Fig. 5 is an elevation of the links used in connecting the piston and connecting rod; and Fig. 6 is a section on line 6—6 of Fig. 5.

In the drawings, 10 designates an internal combustion engine, 11 a piston thereof, 12 a crank shaft, and 13 the crank proper. 14 is a connecting rod directly connected to the crank but indirectly connected to the piston by means of two links 15 and 16. These links are secured to the piston on pivots 17 and 18 which lie in a plane at an angle to the axis of the piston, the upper pivot 17 preferably, though not necessarily, lying in the axial plane of the piston. These links are pivoted to the connecting rod on pivots 17' and 18' which are spaced a less distance apart than are pivots 17 and 18. A toggle-like connection consisting of link 16 and connecting rod 14 is thus obtained, the link 15 serving as a tie or radius member for the connecting rod.

When the crank is at its upper dead center as shown in Fig. 1, the joint or pivot 17' between the link 16 and connecting rod 14 is out of alinement with a line passing through the crank 13 and pivot 17 but continued rotation of the crank shaft will cause the connecting rod to fulcrum on pivot 18' and thus swing the joint 17' into alinement with pivot 17 and crank 13 as illustrated in Fig. 2. The crank in moving from dead center to the position shown in Fig. 2 forces the piston upwardly an appreciable extent due to the straightening of the toggle as will be readily understood.

It will now be seen that the crank is in a most desirable position to receive the initial impulse of the explosion and that such impulse is transmitted when the link 16 and connecting rod are in longitudinal alinement or substantially so.

The arrangement of parts is extremely simple and can readily be applied to existing engines. The links 15 and 16 are secured to the piston and connecting rod in any mechanically simple manner. In engines as heretofore constructed, there is direct connection between the crank shaft and piston and as the gasses are usually exploded while the crank is at or substantially at dead center, the maximum of efficiency is not obtainable.

The present invention makes possible a more efficient engine due to the fact that the piston does not reach its maximum compression until after the crank has passed dead center and consequently the gasses are not exploded until after the crank has passed dead center. The expansive force of the exploded gases is thus immediately effective to turn the crank shaft due to the favorable position of the crank.

What I claim is:

1. In an explosion engine, the combination with the piston and crank shaft, of a connecting rod connected to said crank shaft, a link connecting the upper end of said rod to the piston, and a second link connecting the piston and connecting rod.

2. In an explosion engine, the combination with the piston and crank shaft, of a pair of links pivoted to the piston on pivots spaced apart, a connecting rod pivotally connected to the links by pivots a less distance apart than the aforementioned pivots.

3. In an explosion engine, the combination with the piston and crank shaft, of a connecting rod directly connected to the crank shaft and indirectly connected to the piston by mechanism comprising a pair of links pivoted to said rod on pivots spaced apart, said links being pivoted to the piston on pivots spaced further apart than the aforementioned pivots.

4. In an explosion engine, the combination with the piston and crank shaft, of two links pivoted on pivots in a plane at an angle to the axis of the piston, and a connecting rod connected to said links by pivots spaced a less distance apart than the aforementioned pivots.

5. In an explosion engine, the combination with the piston and crank shaft, of a toggle-like connection between the piston and crank shaft including a crank-shaft connecting-rod, and a radius rod between the piston and connecting rod.

In testimony whereof, I have hereunto set my hand this 24th day of Feb'y, 1922.

AXEL J. BOHMAN.